(12) United States Patent
Miura et al.

(10) Patent No.: US 9,845,878 B2
(45) Date of Patent: Dec. 19, 2017

(54) SEALING STRUCTURE

(71) Applicant: HONDA MOTOR CO., LTD., Tokyo (JP)

(72) Inventors: Taneaki Miura, Wako (JP); Koichi Takaku, Wako (JP); Koichi Kato, Wako (JP); Saneto Asano, Wako (JP); Hiroyasu Ozaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 223 days.

(21) Appl. No.: 13/623,372

(22) Filed: Sep. 20, 2012

(65) Prior Publication Data

US 2013/0069321 A1    Mar. 21, 2013

(30) Foreign Application Priority Data

Sep. 20, 2011 (JP) .................. 2011-205098

(51) Int. Cl.
*F16J 15/16* (2006.01)

(52) U.S. Cl.
CPC .................. *F16J 15/166* (2013.01)

(58) Field of Classification Search
CPC .................. F16J 15/166; B65D 53/00
(Continued)

(56) References Cited

U.S. PATENT DOCUMENTS 2,420,104 A * 5/1947 Smith ................ 277/453
2,462,586 A * 2/1949 Whittingham ............ 277/452
(Continued)

FOREIGN PATENT DOCUMENTS

CN          201434071 Y    3/2010
DE   20 2008 000 0145 U1   6/2009
(Continued)

OTHER PUBLICATIONS

European Search Report application No. 12185152.1 dated Nov. 27, 2012.
(Continued)

*Primary Examiner* — Vishal Patel
*Assistant Examiner* — Thomas Neubauer
(74) *Attorney, Agent, or Firm* — Squire Patton Boggs (US) LLP

(57) ABSTRACT

A sealing structure enables easy fitting of an endless backup ring and includes: tank main body having filling chamber body with filling chamber and mouthpiece portion formed in cylindrical shape integrally with filling chamber body; valve body having insertion portion inserted in mouthpiece portion; O-ring provided between mouthpiece portion and insertion portion; and first backup ring endless and disposed on one side of O-ring to restrict movement of O-ring, wherein annular housing groove is formed on inner circumferential surface of mouthpiece portion such as to be recessed outward with respect to radial direction in order to house O-ring and first backup ring, wherein mouthpiece portion is provided with first cylindrical portion integral with filling chamber body and second cylindrical portion attachable/detachable along axial direction to/from first cylindrical portion, and wherein housing groove is divided along axial direction to face outward when second cylindrical portion detaches from first cylindrical portion.

4 Claims, 4 Drawing Sheets

(58) Field of Classification Search
USPC ........ 277/584, 611, 638, 644; 285/348, 349, 285/351, 339, 341
See application file for complete search history.

(56) References Cited

U.S. PATENT DOCUMENTS

| | | | | |
|---|---|---|---|---|
| 2,799,523 | A * | 7/1957 | Parker | 277/449 |
| 3,004,783 | A * | 10/1961 | Webb | 277/512 |
| 3,514,132 | A * | 5/1970 | Peabody | 285/331 |
| 3,905,608 | A | 9/1975 | Olsen et al. | |
| 4,556,227 | A * | 12/1985 | Sato et al. | 277/619 |
| 7,828,301 | B2 * | 11/2010 | Briscoe et al. | 277/611 |
| 8,752,634 | B2 * | 6/2014 | Tanaka | E21B 17/043 166/208 |
| 2005/0046187 | A1 | 3/2005 | Takeuchi et al. | |

FOREIGN PATENT DOCUMENTS

| | | |
|---|---|---|
| JP | 2002-161983 A | 6/2002 |
| JP | 3543617 B2 | 4/2004 |
| JP | 2005-114007 A | 4/2005 |

OTHER PUBLICATIONS

Office Action dated Sep. 30, 2014, issued in corresponding Chinese Application No. 2014092601078390 (with English translation).

\* cited by examiner

SEALING STRUCTURE

BACKGROUND OF THE INVENTION

Field of the Invention

The present invention relates to a sealing structure.

Description of the Related Art

In recent years, fuel cell vehicles and the like have been rapidly developed, and high pressurizing inside a hydrogen tank (gas tank) for supplying hydrogen (fuel gas, fluid) to a fuel cell has been attempted as a method of increasing a cruising distance. Such a hydrogen tank is formed in a cylindrical outer shape and from aluminum alloy or the like, and is provided with a filling chamber body having a filling chamber (tank chamber) for filling hydrogen inside the chamber.

A mouthpiece portion (cylindrical body) in a cylindrical shape is formed integrally with the filling chamber body on one end side of the filling chamber body, and a valve body (insertion member) in a cylindrical shape is inserted in and screw-engaged with this mouth piece portion. That is, thread portions (an external thread portion, an internal thread portion) are formed respectively in the outer circumferential surface of the valve body and the internal circumferential surface of the mouthpiece portion. An annular O-ring (sealing ring) is provided between the mouthpiece portion and the valve body to prevent leakage of hydrogen. Incidentally, an O-ring is in general made from rubber.

However, as the pressure in the filling chamber varies based on the remaining amount or the temperature of hydrogen, the O-ring moves along the axial direction of the hydrogen tank (mouthpiece portion). That is, in case that the remaining amount of hydrogen is large and the inner pressure of the filling chamber is high, the O-ring is urged toward the outer side along the axial direction by the hydrogen with a high pressure, and on the other hand, in case that the remaining amount of hydrogen is small and the inner pressure of the filling chamber is low, the O-ring is sucked toward the inner side along the axial direction by the hydrogen with a low pressure. Herein, the outer side along the axial direction refers to the direction going away from the filling chamber, and the inner side along the axial direction refers to the direction going closer to the filling chamber. This pressure is referred to as an alternate pressure because this pressure acting on the O-ring varies between a high pressure and a low pressure in such a manner and the direction of the acting force alternates.

However, if the O-ring moves along the axial direction in such a manner, the O-ring digs into an extremely small gap between the mouthpiece portion and the valve body, which should not be present, to be deformed. This deformation forms a scratch or the like on the outer circumferential surface of the O-ring to degrade the sealing effect of the O-ring.

In this situation, presented are technologies for preventing damages of an O-ring accompanying digging-in and deformation of the O-ring, by providing backup rings on the both end sides, with respect to the axial direction, of the O-ring and restricting the movement of the O-ring along the axial direction by these two backup rings (refer to Patent Document 1, Japanese Patent No. 3543617 and Patent Document 2, JP 2002-161983 A).

SUMMARY OF THE INVENTION

Herein, as a backup ring does not function if the backup ring itself deforms accompanying pressure variation inside a filling chamber, a backup ring is formed by a hard material, such as a fluorine resin, a polyamide resin, a hard rubber, a light metal, or the like. Accordingly, as a backup ring itself expands or deforms little, it is extremely difficult to fit an endless backup ring into a housing groove formed in an annular shape on the outer circumferential surface of a valve body.

In this situation, it is conceivable to improve fitting of a backup ring by cutting a part of the backup ring and thereby forming ends of the backup ring. However, when a high pressure acts on an O-ring, it is possible that the O-ring digs into the cut portion of the backup ring and thereby be damaged.

In this situation, an object of the present invention is to provide a sealing structure that enables easy fitting of a backup ring even when an endless backup ring is used.

A sealing structure according to the present invention includes: a filling chamber structure having a filling chamber body with a filling chamber for filling fluid in the filling chamber and a cylindrical body formed in a cylindrical shape integrally with the filling chamber body; an insertion member having an insertion portion with a cylindrical outer shape inserted in the cylindrical body; an O-ring provided between the cylindrical body and the insertion portion to seal fluid; and a first backup ring that is endless and disposed on one side, with respect to an axial direction, of the O-ring to restrict movement of the O-ring along the axial direction, wherein an annular housing groove is formed on an inner circumferential surface of the cylindrical body such as to be recessed outward with respect to a radial direction in order to house the O-ring and the first backup ring, wherein the cylindrical body is provided with a first cylindrical portion integral with the filling chamber body and a second cylindrical portion that is attachable/detachable along the axial direction to/from the first cylindrical portion, and wherein the housing groove is divided along the axial direction to face outward when the second cylindrical portion detaches from the first cylindrical portion.

With such a structure, when the second cylindrical portion is detached from the first cylindrical portion, the housing groove is divided along the axial direction to face outward. Thus, it is possible to easily house the first endless backup ring by moving the first backup ring along the axial direction without deformation such as expanding/shrinking of the diameter. That is, even the first endless backup ring formed from a hard material that expands or deforms little can be easily fitted to the housing groove which is divided along the axial direction and facing outward. Incidentally, the order of fitting the O-ring and the first backup ring may be changed, as appropriate.

Then, by fitting the second cylindrical portion to the first cylindrical portion, the cylindrical body and the housing groove are formed, and the O-ring and the first backup ring become into a state of being housed in the housing groove so that the movement, along the axial direction, of the O-ring and the first backup ring is restricted by the groove width (the width along the axial direction) of the housing groove.

Then, by inserting the insertion portion of the insertion member into the hollow portion of the cylindrical body, the O-ring becomes into a state of being disposed between the cylindrical body and the insertion portion, and thus the sealing structure is formed.

By such a sealing structure, the O-ring provided between the cylindrical body and the insertion portion satisfactorily seals fluid. In other words, fluid in the filling chamber does not leak outside.

Further, even when the O-ring moves to one side, namely, is biased to one side by variation in the pressure of the fluid in the filling chamber, the O-ring contacts with the first backup ring disposed on the one side, in other words, is backed up (restricted) to be inhibited from digging into the gap between the cylindrical body and the insertion portion. Thus, the O-ring does not significantly deform, the outer circumferential surface of the O-ring is prevented from being damaged, and the sealing effect of the O-ring is not degraded.

Still further, as the first backup ring is endless, the O-ring is prevented from digging into the cut portion of a backup ring, and the outer circumferential surface of the O-ring is prevented from being damaged.

The sealing structure further preferably includes a second backup ring that is endless, disposed on another side of the O-ring to restrict the movement of the O-ring along the axial direction, and is housed in the housing groove.

With such a structure, in case that the second cylindrical portion is detached from the first cylindrical portion, similarly to the first backup ring, it is possible to easily house the second endless backup ring into the housing groove facing outside with respect to the axial direction, without deformation of the second endless backup ring.

In the sealing structure after fitting the respective components, the second backup ring becomes into a state of being disposed on the other side of the O-ring, in other words, the O-ring becomes into a state that the O-ring is sandwiched by the first backup ring and the second backup ring along the axial direction.

Thus, even when the O-ring moves to the other side, namely, is biased to the other side by variation in the pressure of the fluid in the filling chamber, the O-ring contacts with the second backup ring disposed on the other side, in other words, is backed up (restricted) to be inhibited from digging into the gap between the cylindrical body and the insertion portion. Thus, the O-ring does not significantly deform, the outer circumferential surface of the O-ring is prevented from being damaged, and the sealing effect of the O-ring is not degraded.

That is, even when an alternative pressure acts on the O-ring by variation in the pressure of the fluid in the filling chamber, the movement of the O-ring is satisfactorily backed up (restricted) by the first backup ring and the second backup ring disposed on the both sides of the O-ring.

Further, as the second backup ring is endless, the O-ring is prevented from digging into the cut portion of a backup ring, and the outer circumferential surface of the O-ring is prevented from being damaged.

Further, the sealing structure is preferably arranged in the following manner, wherein the first cylindrical portion includes a first hollow portion corresponding to an outer diameter of the insertion portion, and a second hollow portion corresponding to an outer diameter of the second cylindrical portion, the second hollow portion being continuous with the first hollow portion and having a diameter larger than a diameter of the first hollow portion, wherein thread portions are formed respectively on an inner circumferential surface of the first cylindrical portion that encloses the second hollow portion and on an outer circumferential surface of the second cylindrical portion to screw-engage the first cylindrical portion and the second cylindrical portion, and wherein the thread portions are disposed outer, with respect to a radial direction, than the housing groove.

With such a structure, the second cylindrical portion can be easily attach/detach to/from the first cylindrical portion by the tread portions that are formed respectively on the inner circumferential surface of the first cylindrical portion enclosing the second hollow portion and the outer circumferential surface of the second cylindrical portion, the thread portions screw-engaging the first cylindrical portion and the second cylindrical portion.

The second hollow portion corresponds to the outer diameter of the second cylindrical portion, and has a diameter larger than the diameter of the first hollow portion that corresponds to the outer diameter of the insertion section, wherein as the thread portion is disposed outer, with respect to the radial direction, than the housing groove, the circumferential length of the thread portion is longer than the circumferential length of the housing groove.

Thus, in case that the second cylindrical portion is screw-engaged with the first cylindrical portion, the first cylindrical portion and the second cylindrical portion do not separate from each other along the axial direction. The force of holding the first cylindrical portion and the second cylindrical portion at the screw-engagement position, in other words, the strength of fitting the first cylindrical portion and the second cylindrical portion to each other becomes higher compared with a structure in which thread portions are disposed inner (on the central axis side) than a housing groove with respect to the radial direction. That is, even when the pressure of the fluid inside the filling chamber significantly varies, the first cylindrical portion and the second cylindrical portion hardly separate from each other along the axial direction. Accordingly, the length of the thread portions can be shortened along the axial direction, in other words, the number of pitches at the thread portion can be decreased. Further, when the length of the thread portions are shortened along the axial direction, the lengths of the first cylindrical portion and the second cylindrical portion can also be shortened along the axial direction.

According to the present invention, it is possible to provide a sealing structure for which a backup ring can be easily fitted even when an endless backup ring is used.

DETAILED DESCRIPTION OF THE PREFERRED EMBODIMENT

An embodiment according to the present invention will be described below, referring to FIGS. 1 to 3.

Herein, as an example, described will be a case that a sealing structure is applied to the structure of a mouthpiece portion (neck portion) of a hydrogen tank in which hydrogen (fluid) is filled at a high pressure. Such a hydrogen tank is mounted, for example, horizontally on a fuel cell vehicle to serve as a hydrogen supply source for a fuel cell. However, usage of the hydrogen tank is not limited thereto, and can be applied, for example, as a hydrogen supply source for a stationary fuel cell.

Arrangement of Sealing Structure

Figure 1:
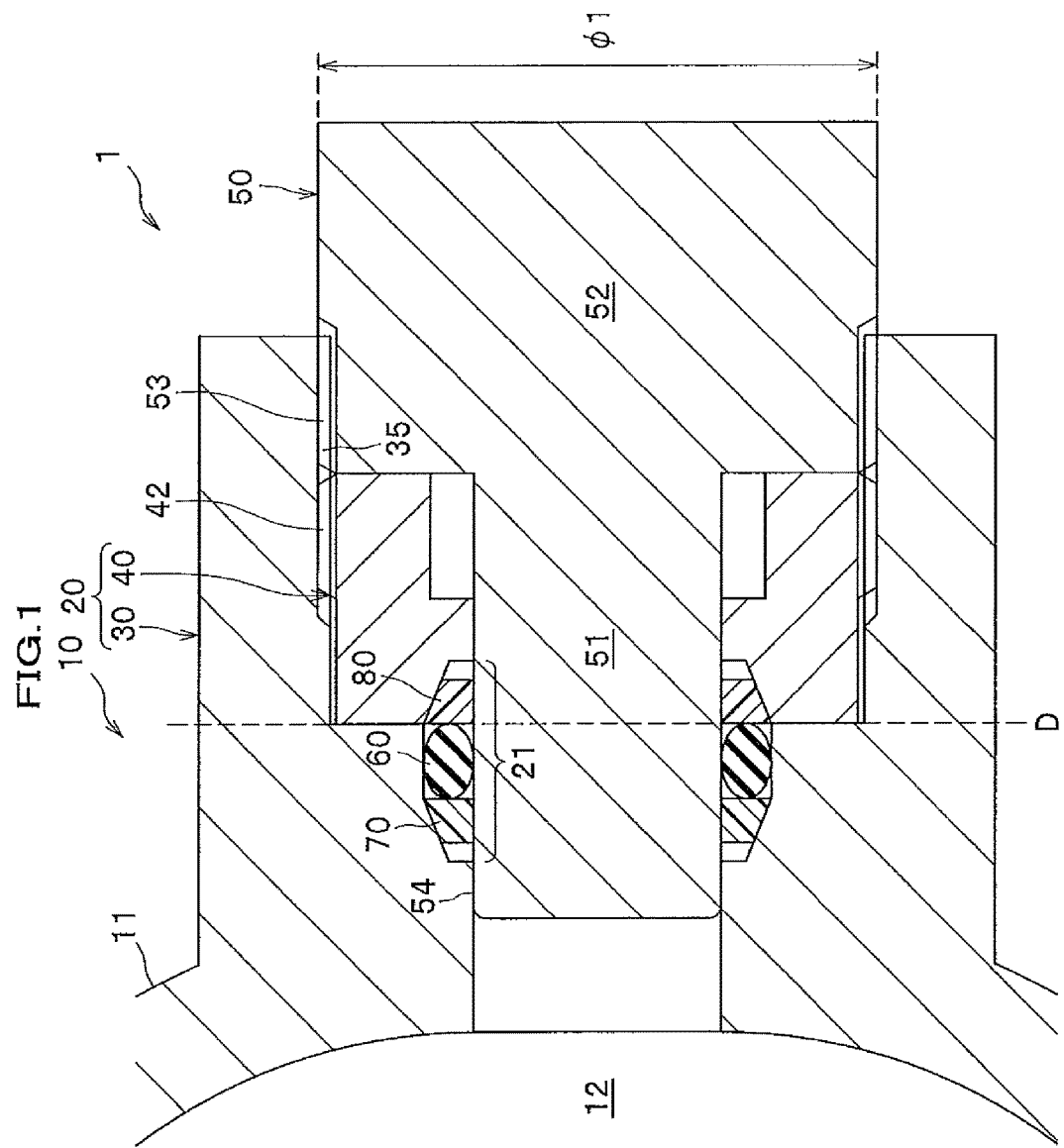
FIG. 1 is a side cross-sectional view of a sealing structure according to the present embodiment.

As shown in FIG. 1, a sealing structure 1 forms a part of a hydrogen tank, and includes a tank main body 10 (a filling chamber structure), a cylindrical valve body 50 (an insertion member), an O-ring 60, a first backup ring 70, and a second backup ring 80.

Incidentally, in addition, the hydrogen tank is provided with a reinforcing layer (not shown) formed on the outer circumferential surface of a later-described filling chamber body 11 of the tank main body 10. The reinforcing layer is formed, for example, of a fiber reinforcing plastic, such as CFRP (Carbon Fiber Reinforced Plastics).

Tank Main Body

The tank main body 10 is made of metal, such as an aluminum alloy for example, and is a component also referred to as a liner. The tank main body 10 has a cylindrical outer shape and includes a filling chamber body 11 that is in a shell shape having a filling chamber 12 (a tank chamber) therein and a mouthpiece portion 20 (a cylindrical body) in a cylindrical shape formed integrally with the filling chamber body 11 at one end portion of the filling chamber body 11.

Tank Main Body—Mouthpiece Portion

A mouthpiece portion 20 is substantially in a cylindrical shape, and includes a first cylindrical portion 30 that is formed integrally with the filling chamber body 11 and in a cylindrical shape extending to the outer side with respect to the axial direction from the one end portion of the filling chamber body 11, and a second cylindrical portion 40 that is in a cylindrical shape and attachable/detachable along the axial direction to/from the first cylindrical portion 30. That is, the mouthpiece portion 20 has a structure that can be divided into the first cylindrical portion 30 and the second cylindrical portion 40 with respect to the axial direction at a dividing plane D.

Incidentally, the axial direction corresponds to the longitudinal direction of the hydrogen tank in a cylindrical shape, the outer side with respect to the axial direction corresponds to the external portion side (the right side in FIG. 1), and the inner side with respect to the axial direction corresponds to the filling chamber 12 side (the left side in FIG. 1).

A housing groove 21 in an annular shape recessed outward with respect to the radial direction is formed on the inner circumferential surface of the mouthpiece portion 20 (see FIG. 20). The housing groove 21 is a groove for housing an O-ring 60, the first backup ring 70, and the second backup ring 80.

The housing groove 21 is disposed such as to be across the dividing plane D with respect to the axial direction, in other words, such as to be across the first cylindrical portion 30 and the second cylindrical portion 40. When the second cylindrical portion 40 detaches from the first cylindrical portion 30, the housing groove 21 is also divided into a first half groove 22 and a second half groove 23 with respect to the axial direction (see FIG. 3). The first half groove 22 is formed on the first cylindrical portion 30 and the second half groove 23 is formed on the second cylindrical portion 40. The first half groove 22 faces outward in a state that the second cylindrical portion 40 is removed.

The width of the housing groove 21 is arranged such as to form gaps respectively on the inner side, with respect to the axial direction, of the first backup ring 70 and on the outer side, with respect to the axial direction, of the second backup ring 80.

Figure 2:
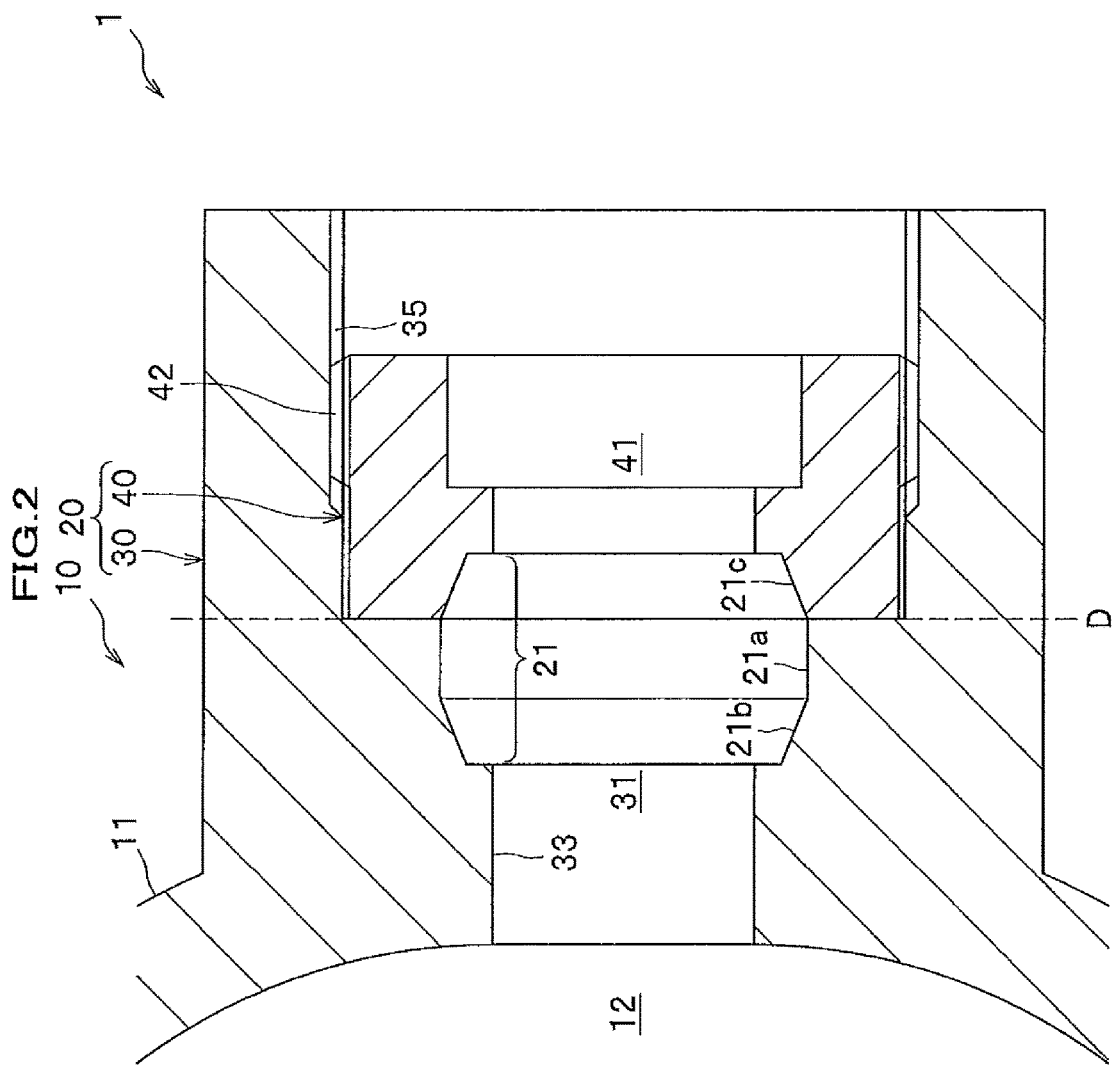
FIG. 2 is a side cross-sectional view of the sealing structure according to the present embodiment, wherein a valve body and the like are omitted in the figure.

The bottom surface of the housing groove 21 includes a first bottom surface 21a that is parallel to the axial direction, a second bottom surface 21b that is continuous, on the inner side with respect to the axial direction, with the first bottom surface 21a, and a third bottom surface 21c that is continuous, on the outer side with respect to the axial direction, with the first bottom surface 21a (see FIG. 2).

The first bottom surface 21a is a surface that tightly contacts with the outer circumferential surface of the O-ring 60.

The second bottom surface 21b is a tapered surface inclined such that the depth of the groove becomes larger toward the first bottom surface 21a. The outer circumferential surface 71, in a tapered shape, of the first backup ring 70 (see FIG. 3) is in contact with the second bottom surface 21b. Thus, when the inner pressure of the filling chamber 12 drops by discharge of hydrogen and a pressure acts on the O-ring 60 and the first backup ring 70 inward (leftward in FIG. 1) with respect to the axial direction, the first backup ring 70 is compressed in the radial direction by the second bottom surface 21b and the outer circumferential surface 54 of the later described insertion portion 51, and thereby further tightly contacts with the second bottom surface 21b and the like. Accordingly, it is prevented that the O-ring 60 digs into the gap between the first backup ring 70 and the second bottom surface 21b or the gap between the first backup ring 70 and the outer circumferential surface 54.

The third bottom surface 21c is a tapered surface inclined such that the depth of the groove becomes larger toward the first bottom surface 21a. The outer circumferential surface 81, in a tapered shape, of the second backup ring 80 (see FIG. 3) is in contact with the third bottom surface 21c. Thus, when the inner pressure of the filling chamber 12 rises by filling hydrogen and a pressure acts on the O-ring 60 and the second backup ring 80 outward (rightward in FIG. 1) with respect to the axial direction, the second backup ring 80 is compressed in the radial direction by the third bottom surface 21c and the outer circumferential surface 54 of the insertion portion 51, and thereby further tightly contacts with the third bottom surface 21c and the like. Accordingly, it is prevented that the O-ring 60 digs into the gap between the second backup ring 80 and the third bottom surface 21c or the gap between the second backup ring 80 and the outer circumferential surface 54.

Herein, the dividing plane D is disposed at the border position, with respect to the axial direction, between the first bottom surface 21a and the third bottom surface 21c. On the outer side, with respect to the radial direction, of the first bottom surface 21a, which receives a force from the O-ring 60 outward with respect to the radial direction, neither an external thread portion 42 nor an internal thread portion 35 is disposed, and only the through-wall portion of the first cylindrical portion 30 is present (see FIG. 2). Thus, it is prevented that a force acts on the external thread portion 42 or the internal thread portion 35 outward, with respect to the radial direction, from the O-ring 60. Accordingly, the external thread portion 42 and the internal thread portion 35 hardly deform, and it hardly occurs that the second cylindrical portion 40 cannot be attached/detached.

Tank Main Body—Mouth Piece Portion—First Cylindrical Portion

Figure 3:
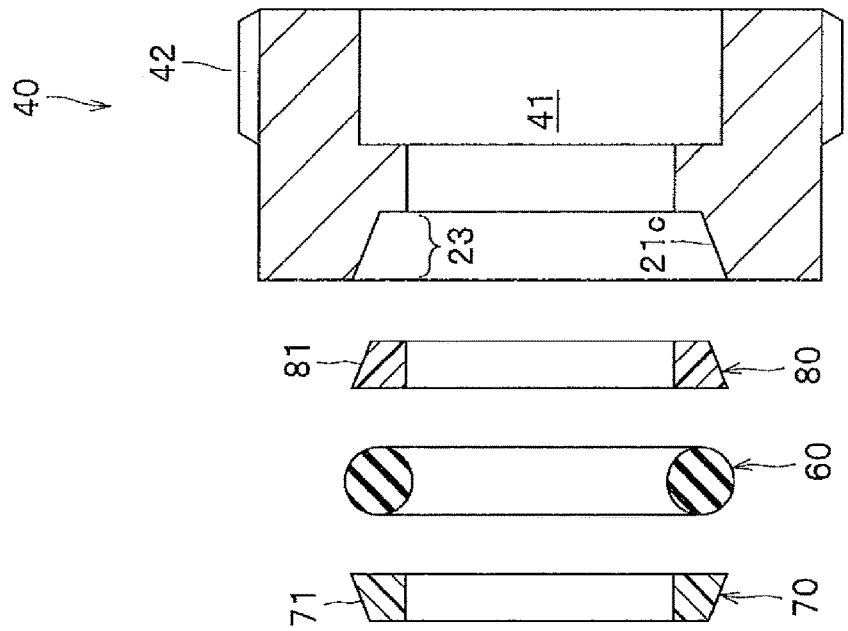
FIG. 3 is an exploded view of the sealing structure according to the present embodiment.
Figure 3:
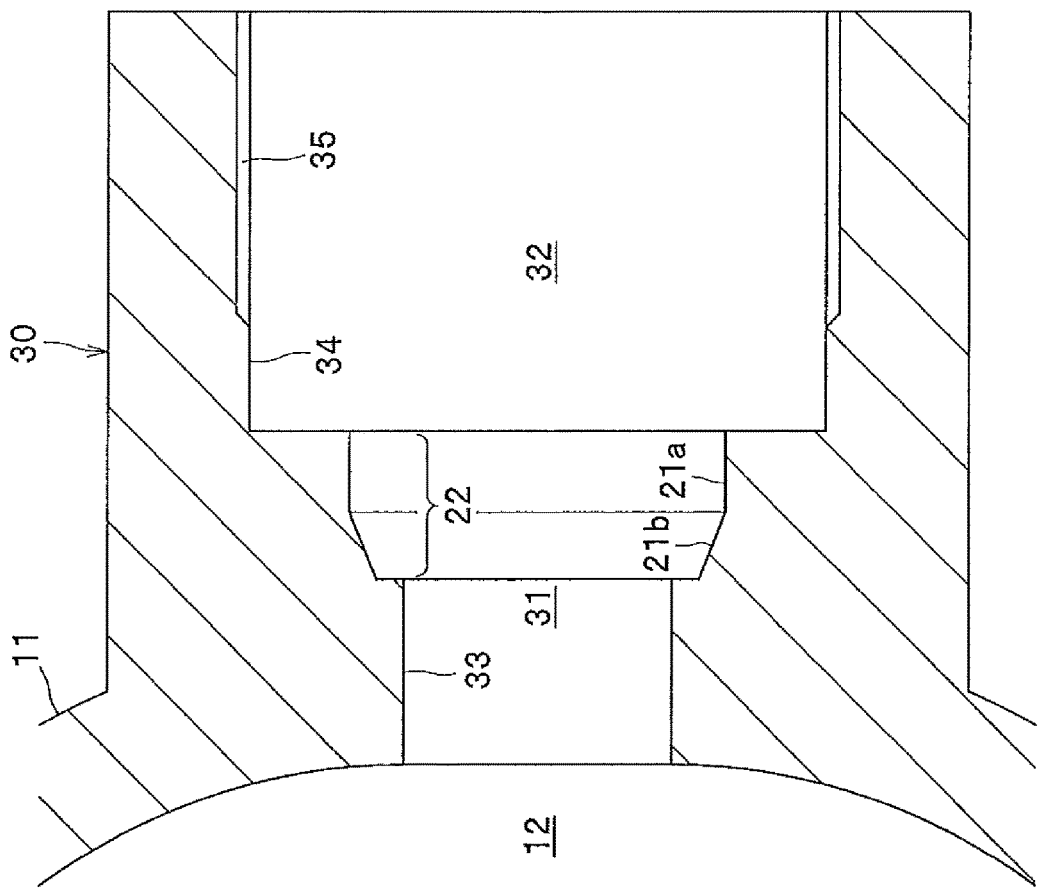

The first cylindrical portion 30 is, as described above, in a cylindrical shape, and includes a first hollow portion 31 communicating with the filling chamber 12, a second hollow portion 32 that is continuous, outward with respect to the axial direction, with the first hollow portion 31 and has a diameter larger than the diameter of the first hollow portion 31 (see FIG. 3). That is, the inner circumferential surface of the first cylindrical portion 30 is stepped such as to be formed with a first inner circumferential surface 33 enclosing the first hollow portion 31 and a second inner circumferential surface 34 enclosing the second hollow portion 32.

The first hollow portion 31 corresponds to the outer diameter of the later-described insertion portion 51 of the valve body 50, and the insertion portion 51 is inserted in the first hollow portion 31. The second hollow portion 32 corresponds to the outer diameter of the second cylindrical portion 40.

The first half groove 22 is formed on the outer side, with respect to the axial direction, of the first inner circumferential surface 33.

The internal thread portion 35 is formed on the inner circumferential surface 34 from a point on the inner circumferential surface 34 toward the opening of the first cylindrical portion 30. The internal thread portion 35 is a recession that screw-engages with the external thread portion 42 of the second cylindrical portion 40 and an external portion 53 of the valve body 50 (see FIG. 1).

Tank Main Body—Mouthpiece Portion—Second Cylindrical Portion

The second cylindrical portion 40 is a component in a cylindrical shape to form a part of the mouthpiece portion 20, by being attached to the first cylindrical portion 30.

Similarly to the first hollow portion 31 of the first cylindrical portion 30, the hollow portion 41 (see FIG. 2) of the second cylindrical portion 40 corresponds to the outer diameter of the later-described insertion portion 51 of the valve body 50, and the insertion portion 51 is inserted in the hollow portion 41.

The external thread portion 42 is formed on the outer side, with respect to the axial direction, of the outer circumferential surface of the second cylindrical portion 40. The external thread portion 42 is screw-engaged with the internal thread portion 35 of the first cylindrical portion 30, and the second cylindrical portion 40 is directly fixed to the first cylindrical portion 30.

Figure 4:
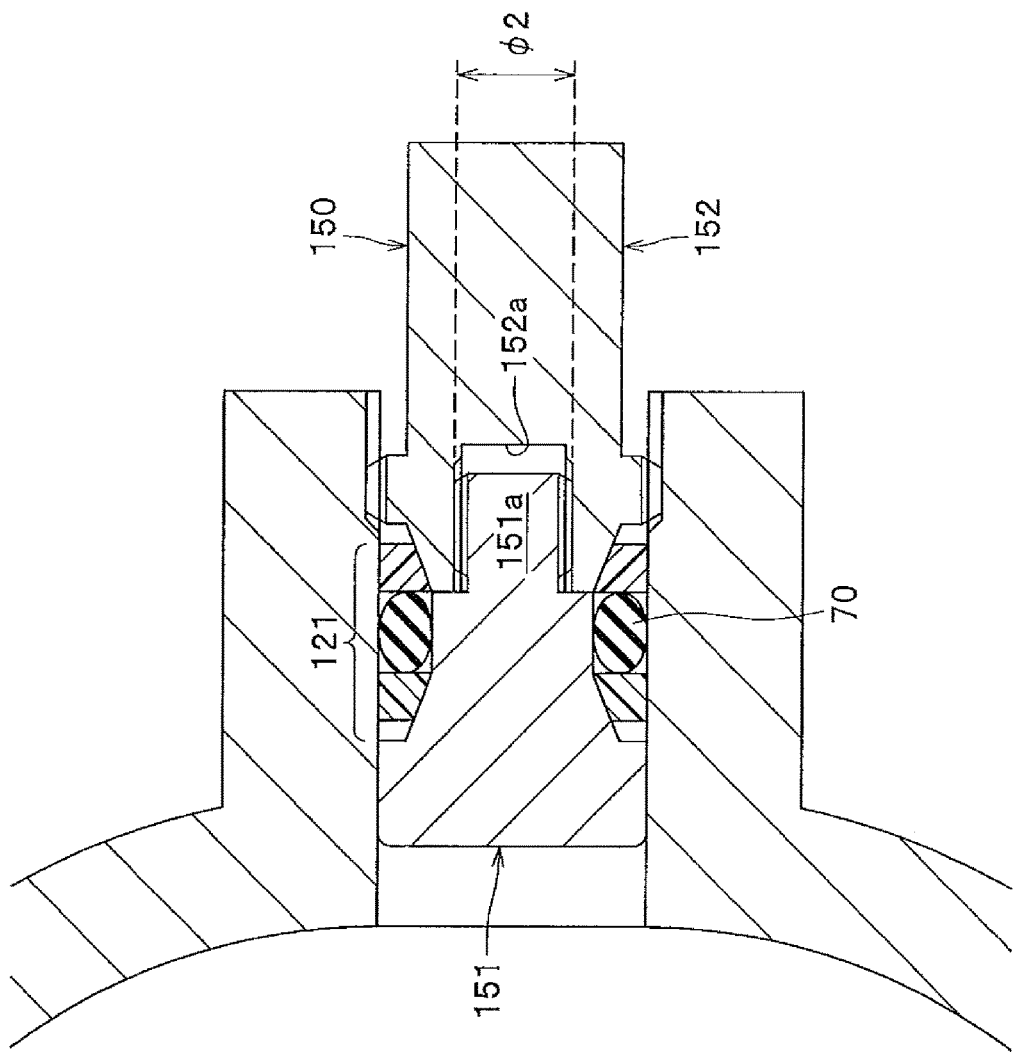
FIG. 4 is a side cross-sectional view of a sealing structure of a comparative example.

Herein, the external thread portion 42 and the internal thread portion 35 are disposed on the outer side, with respect to the radial direction, of the housing groove 21, wherein the fitting diameter $\phi 1$ between the first cylindrical portion 30 and the second cylindrical portion 40 is larger than the fitting diameter $\phi 2$ in the structure shown in FIG. 4.

Thus, with respect to the axial direction, the fitting strength between the first cylindrical portion 30 and the second cylindrical portion 40 is larger than the fitting strength between the insertion portion 151 and the base portion 152 shown in FIG. 4. Accordingly, for example, even when the inner pressure of the filling chamber 12 becomes high by filling hydrogen, the external thread portion 42 and the internal thread portion 35 hardly deform, and the second cylindrical portion 40 hardly moves outward with respect to the axial direction. Thus, it is possible to increase the maximum filling pressure inside the filling chamber 12. Accordingly, in case that a hydrogen tank is mounted on a fuel cell vehicle, the cruising distance of the fuel cell vehicle becomes long.

Incidentally, the structure in FIG. 4 is arranged such that a housing groove 121 is formed on the outer circumferential surface of the valve body 150 with a whole thickness equivalent to that of the insertion portion 51 in FIG. 1, the housing groove 121 being formed such as to be recessed inward with respect to the radial direction, and the valve body 150 is arranged such as to be divided into the insertion portion 151 and the base portion 152. A screw 151*a* having an external thread portion on the outer circumferential portion thereof is formed at the end on the outer side, with respect to the axial direction, of the insertion portion 151, and the inner end, with respect to the axial direction, of the base portion 152 is provided with an internal thread portion on the inner circumferential surface thereof, wherein a screw hole 152*a* is formed to be screw-engaged with the screw 151*a*. The outer diameter of the screw 151*a* and the inner diameter of the screw hole 152*a* correspond to the fitting diameter $\phi 2$.

Valve Body

The valve body 50 substantially has a cylindrical shape with a stepped outer circumferential surface.

Herein, the valve body 50 is shown in FIG. 1, taking an example of a solid structure for brevity of description, however, the valve body 50 actually forms, for example, a part of an electromagnetic valve that discharges hydrogen in the filling chamber 12 to outside (to a fuel cell or the like) by being opened, for example, as described in JP 2011-149502 A. In this case, a discharging flow path is formed inside the valve body 50 to discharge hydrogen by communication between the filling chamber 12 and the outside. Further, a valve body for opening/closing the opening, on the filling chamber 12 side, of the discharging flow path, a plunger, a solenoid, and the like for reciprocal movement of the valve body along the axial direction, are disposed on the filling chamber 12 side of the insertion portion 51.

In addition, there is also a case that a filling flow path for filling hydrogen and a relief flow path for discharging hydrogen to outside when the pressure exceeds a predetermined pressure are formed inside the valve body 50.

Such a valve body 50 is provided with the insertion portion 51 in a cylindrical shape with a small diameter and the base portion 52 formed continuously outward with respect to the axial direction of the insertion portion 51.

Valve Body Insertion Portion

The insertion portion 51 is inserted in the first hollow portion 31 of the first cylindrical portion 30 and the hollow portion 41 of the second cylindrical portion 40.

Valve Body Base Portion

The base portion 52 has a cylindrical shape with a diameter larger than that of the insertion portion 51. On the filling chamber 12 side of the outer circumferential surface of the base portion 52, an external thread portion 53 is formed. The external thread portion 53 is screw-engaged with the internal thread portion 35 of the above-described first cylindrical portion 30.

O-Ring

The O-Ring 60 has an annular shape and is formed from an elastic material such as rubber.

The O-Ring 60 is arranged between the mouthpiece portion 20 (the first cylindrical portion 30) and the insertion portion 51 and is housed in the housing groove 21. The O-ring 60 is compressed in the radial direction by the first bottom surface 21*a* of the housing groove 21 and the outer circumferential surface 54 of the insertion portion 51, and thereby deformed. Thus, the sealing function of the O-ring 60 satisfactorily works, and hydrogen is prevented from leaking outside.

First and Second Backup Rings

The first backup ring 70 and the second backup ring 80 are rings that restrict the movement of the O-ring 60 along the axial direction in order to prevent the O-ring 60 from digging into the extremely small gap between the mouthpiece portion 20 and the insertion portion 51. The first backup ring 70 and the second backup ring 80 are formed from a hard material such as a fluorine resin, a polyamide resin, a hard rubber, a light metal, or the like, and the backup rings accordingly do not deform even when the pressure in the filling chamber 12 varies and an alternate pressure acts.

Neither the first backup ring 70 nor the second backup ring 80 is cut in the circumferential direction, and the both backup rings are endless.

The first backup ring 70 and the second backup ring 80 are housed in the housing groove 21. In detail, the first backup ring 70 is disposed in the inner side (on the one side, namely the left side in FIG. 1), with respect to the axial direction, of the O-ring 60, while the second backup ring 80 is disposed on the outer side (the other side, namely the right side in FIG. 1), with respect to the axial direction, of the O-ring 60. That is, along the axial direction, the O-ring 60 is sandwiched by the first backup ring 70 and the second backup ring 80.

Thus, even when the pressure in the filling chamber 12 rises by filling hydrogen or the pressure of hydrogen drops by discharging hydrogen, and thereby the O-Ring 60 moves to the left or right in FIG. 1, in other words, an alternate pressure acts on the O-ring 60, the movement of the O-ring 60 is restricted by the first backup ring 70 or the second backup ring 80. Accordingly, the O-ring 60 is prevented from digging into the above-described gap, and the outer circumferential surface of the O-ring 60 is prevented from being damaged.

Further, as described above, the first backup ring 70 and the second backup ring 80 are endless, and neither has a cut portion in the circumferential direction. Thus, even when the pressure in the filling chamber 12 varies and an alternate pressure acts on the O-Ring 60, it does not occur that the O-ring 60 digs into a cut portion, and the outer circumferential surface of the O-ring 60 is prevented from being damaged.

Advantage of Sealing Structure

In such a sealing structure 1, as the first backup ring 70 and the second backup ring 80 are endless and do not have a cut portion in the circumferential direction, even when an alternate pressure acts on the O-ring 60, it does not occur that the O-ring 60 digs into a cut portion, and the outer circumferential surface of the O-ring 60 is prevented from being damaged. Thus, hydrogen can be satisfactorily sealed by the O-Ring 60.

Fitting for Assembly of Sealing Structure

The procedure of fitting for assembling the sealing structure 1 will be described below.

As shown in FIG. 3, in a state that the second cylindrical portion 40 is removed from the first cylindrical portion 30, the housing groove 21 is divided into the first half groove 22 and the second half groove 23 along the axial direction, and the first half groove 22 of the first cylindrical portion 30 is in a state of facing outward with respect to the axial direction to be open outward with respect to the axial direction.

Then, into the first half groove 22 facing outward in such a manner, the first backup ring 70, the O-ring 60, and the second backup ring 80 are housed in this order starting from the filling chamber 12 side with respect to the axial direction. In this case, as the first half groove 22 faces outward, the first backup ring 70 and the second backup ring 80, which are endless and formed of a hard material, can be easily housed into the first half groove 22 without deformation or the like.

Incidentally, in order to prevent position deviation of the second backup ring 80 and the like along the radial direction, a guide body in a cylindrical shape with the same thickness as that of the insertion portion 51 may be inserted in the first hollow portion 31 of the first cylindrical portion 30. In this case, the guide body can be removed after fitting the second cylindrical portion 40.

Further, the second backup ring 80 may be housed in the second half groove 23 of the second cylindrical portion 40 instead of the first half groove 22.

Then, fitting the external thread portion 42 with the internal thread portion 35, the second cylindrical portion 40 is rotated to be screw-engaged with the first cylindrical portion 30 so that the second cylindrical portion 40 is attached with the first cylindrical portion 30. Thus, the first half groove 22 and the second half groove 23 meet with each other along the axial direction, and the housing groove 21 is thereby formed. Simultaneously, the O-ring 60, the first backup ring 70, and the second backup ring 80 become in a state of being housed in the housing groove 21. Then, the first hollow portion 31 of the first cylindrical portion 30, the hollow portion of the first backup ring 70, the hollow portion of the O-ring 60, the hollow portion of the second backup ring 80, and the hollow portion 41 of the second cylindrical portion 40 become in a state of being continuous along the axial direction.

Then, while the insertion portion 51 of the valve body 50 being inserted into the hollow portion 41 of the second cylindrical portion 40 and the like, the valve body 50 is rotated, with the external thread portion 53 being fitted to the internal thread portion 35, so that the valve body 50 is screw-engaged with the first cylindrical portion 30, and the valve body 50 is thereby attached to the first cylindrical portion 30.

Thus, fitting of the respective components is completed and the sealing structure 1 is obtained.

Modified Example

An embodiment according to the present invention has been described above, however, the invention is not limited thereto, and for example, the following modification can be made.

The foregoing embodiment has been described, taking an example of a structure including both the first backup ring 70 and the second backup ring 80, however, for example, a structure having only one of the backup rings may be arranged.

The forgoing embodiment has been described, taking an example of a structure including the external thread portion 42 on the outer circumferential surface of the second cylindrical portion 40, however, for example, a structure without the external thread portion 42 may be arranged. Even with such a structure, the second cylindrical portion 40 is restricted with respect to the axial direction by the base portion 52 of the valve body 50 that is screw-engaged with first cylindrical portion 30.

The forgoing embodiment has been described, taking an example of a structure where the filled fluid is hydrogen (gas), another kind of gas (CNG gas or the like) or liquid may be filled.

What is claimed is:
1. A sealing structure, comprising:
   a tank main body having a filling chamber body with a filling chamber for filling fluid in the filling chamber and a cylindrical body formed in a cylindrical shape integrally with the filling chamber body;
   an insertion member having an insertion portion with a cylindrical outer shape inserted in the cylindrical body;
   an O-ring provided between the cylindrical body and the insertion portion to seal fluid;

a first backup ring that is endless and disposed on one side, with respect to an axial direction, of the O-ring to restrict movement of the O-ring along the axial direction, wherein an annular housing groove is formed on an inner circumferential surface of the cylindrical body such as to be recessed outward with respect to a radial direction in order to house the O-ring and the first backup ring, wherein the cylindrical body is provided with a first cylindrical element integral with the filling chamber body and a second cylindrical element that is attachable/detachable along the axial direction to/from the first cylindrical element, wherein, when the second cylindrical element detaches from the first cylindrical element, the housing groove is divided into a first half groove and a second half groove at a dividing surface along the axial direction such that the first half groove faces outward, wherein the dividing surface is a surface on which the first cylindrical element and the second cylindrical element come in contact with each other; and wall parts extending in the radial direction are provided at both ends of the housing groove that comprises a first bottom surface, a second bottom surface, and a third bottom surface, said both ends of the housing groove being bound on both sides of the housing groove in an axial direction, wherein each of the wall parts continues from the second bottom surface and the third bottom surface, and a first space is provided between one of the wall parts and the first backup ring and a second space is provided between the other of the wall parts and a second backup ring, wherein the sealing structure is subject to alternate pressure, wherein the second cylindrical element prevents movement of the second backup ring, and wherein movement of the second cylindrical element is prevented by a thread portion of the cylindrical body, wherein the second cylindrical element includes a bottom surface which is on a side of the dividing surface and a top surface which is opposite to the bottom surface, and wherein the insertion member is a separate body from the second cylindrical element, and presses the top surface of the second cylindrical element in the axial direction by threadedly engaging with the thread portion of the first cylindrical element, wherein the insertion member has a first outer diameter and a second smaller outer diameter, the first cylindrical element has an outer diameter and an inner diameter, and the second cylindrical element has an outer diameter and an inner diameter, wherein the first outer diameter of the insertion member corresponds to the inner diameter of the second cylindrical element, the outer diameter of the second cylindrical element corresponds to the inner diameter of the first cylindrical element, and the inner diameter of the second cylindrical element corresponds to the second smaller outer diameter of the insertion member.

2. The sealing structure according to claim 1, further comprising:

the second backup ring that is endless, disposed on another side of the O-ring to restrict the movement of the O-ring along the axial direction, and is housed in the housing groove.

3. The sealing structure according to claim 1, wherein the first cylindrical includes a first hollow portion corresponding to an outer diameter of the insertion portion, and a second hollow portion corresponding to an outer diameter of the second cylindrical, the second hollow portion being continuous with the first hollow portion and having a diameter larger than a diameter of the first hollow portion, wherein thread portions are formed respectively on an inner circumferential surface of the first cylindrical that encloses the second hollow portion and on an outer circumferential surface of the second cylindrical to screw-engage the first cylindrical and the second cylindrical, and wherein the thread portions are disposed outer, with respect to a radial direction, than the housing groove.

4. The sealing structure according to claim 2, wherein the first cylindrical includes a first hollow portion corresponding to an outer diameter of the insertion portion, and a second hollow portion corresponding to an outer diameter of the second cylindrical, the second hollow portion being continuous with the first hollow portion and having a diameter larger than a diameter of the first hollow portion, wherein thread portions are formed respectively on an inner circumferential surface of the first cylindrical that encloses the second hollow portion and on an outer circumferential surface of the second cylindrical to screw-engage the first cylindrical and the second cylindrical, and wherein the thread portions are disposed outer, with respect to a radial direction, than the housing groove.

* * * * *